(No Model.)

E. E. CARPENTER.
MIXING BOARD.

No. 529,706. Patented Nov. 27, 1894.

Witnesses
Chas. F. Schmelz
E. M. Healy

Inventor
E. E. Carpenter
By Attorneys
Southgate & Southgate

UNITED STATES PATENT OFFICE.

ELMER E. CARPENTER, OF WORCESTER, MASSACHUSETTS.

MIXING-BOARD.

SPECIFICATION forming part of Letters Patent No. 529,706, dated November 27, 1894.

Application filed April 10, 1894. Serial No. 507,025. (No model.)

*To all whom it may concern:*

Be it known that I, ELMER E. CARPENTER, a citizen of the United States, residing at Worcester, in the county of Worcester and State of Massachusetts, have invented a new and useful Improvement in Mixing-Boards, of which the following is a specification.

The object of my invention is to provide a kitchen utensil or mixing board, which shall be strong, durable, which will prevent the flour or dough from being wasted, and which may be easily cleaned; and to these ends, my invention consists of the parts and combinations of parts, as hereinafter described, and more particularly pointed out in the claim at the end of this specification.

Figure 1:
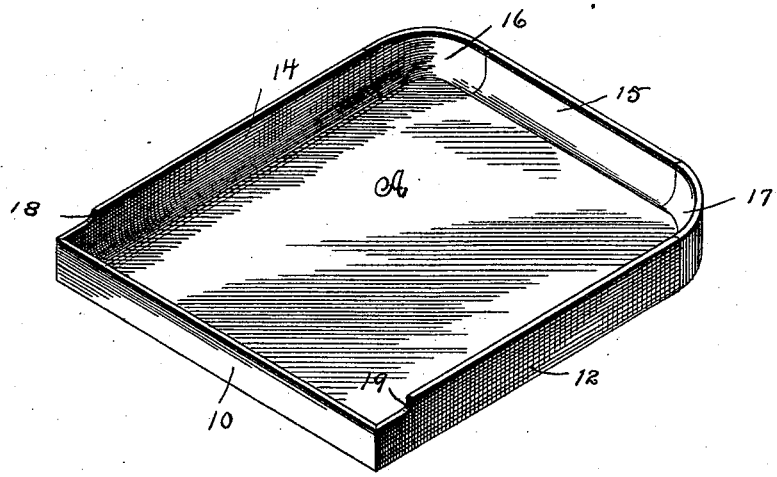
Figure 2:
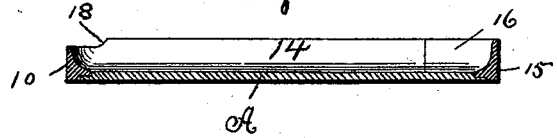

In the accompanying drawings, Figure 1 is a perspective view illustrating a mixing board constructed according to my invention. Fig. 2 is a transverse sectional view of the same, and Fig. 3 is an enlarged detail view showing the form of molding, which I preferably employ, and the manner in which it is applied to the board.

Figure 3:
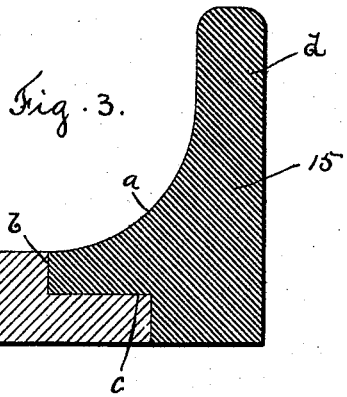

Referring to the drawings and in detail, A designates the base or board, which forms the body of my improved mixing board, and which is rounded off at its rear corners, and is rabbeted upon all sides to receive a projecting molding or binding, as most clearly shown in Fig. 3.

10 designates a strip of molding, which is secured at the front of the board A, and is mitered or cut off at an angle at its corners, to join the side strips or moldings 12 and 14. The side strips 12 and 14 are preferably higher than the front molding strip 10, being curved away or cut down at 18 and 19, to join the strip 10, as shown. The side molding strips 12 and 14 extend to and join the corner pieces 16 and 17, as shown, the corner pieces 16 and 17 being connected by a rear strip of molding 15. The molding strips, which thus completely surround my board and form an inclosed mixing board to prevent the flour or dough from being wasted, are preferably formed with a curved portion *a*, which extends from the vertical section of the molding *d*, and tangentially joins the surface of the board A to form a rounded or filled in corner, which may be easily cleaned, and which will prevent the flour or other material from becoming lodged therein. The molding strips are rabbeted or cut away at *c* to nicely fit into and join the rabbeted or cut away portion *b* of the board A, and may be firmly secured or glued thereto, as shown.

In constructing my improved mixing board, the corner pieces 16 and 17 are preferably turned to the required shape by means of the ordinary face lathe, but, if preferred, the molding strips may be formed in sections, and may be bent around the rear rounded corners of the board. With a mixing board thus constructed, it will be seen that I have provided a utensil which is surrounded on all sides by a raised barrier or molding, which will prevent the flour or other material from being wasted, and, as the angle between the molding strips and the surface of the board is rounded or filled in, my device may be quickly cleaned, and will not afford a lodging place for the flour or dough to collect in. I also consider it of advantage to form the front molding strips lower than the moldings on the other sides of the device, so that the same will not interfere with the free use of the surface of the board, but, if preferred, the molding strips may be formed of the same height on all sides.

I am aware that slight changes may be made in the construction of my device, without departing from the spirit of my invention, as expressed in the claim.

I do not wish, therefore, to be limited to the exact details which I have shown and described, but What I do claim, and desire to secure by Letters Patent of the United States, is—

In a mixing board, the combination of the base or body portion A, the side molding strips 12 and 14 having cut away portions 18 and 19, a narrow front molding strip 10, the rear molding strip 15, and the turned corner pieces 16 and 17 the moldings being rabbeted or cut away to fit into the rabbeted or cut away portion of the board A, and having the angle between said molding strips and the surface of the board filled in or rounded, to allow the device to be easily cleansed, substantially as described.

In testimony whereof I have hereunto set my hand in the presence of two subscribing witnesses.

ELMER E. CARPENTER.

Witnesses:
PHILIP W. SOUTHGATE,
E. M. HEALY.